(12) United States Patent
Janitschke

(10) Patent No.: US 10,378,546 B2
(45) Date of Patent: Aug. 13, 2019

(54) TURBOMACHINE ARRANGEMENT

(71) Applicant: Atlas Copco Energas GmbH, Cologne (DE)

(72) Inventor: Klaus Janitschke, Bornheim-Waldorf (DE)

(73) Assignee: Atlas Copco Energas GmbH, Cologne (DE)

( * ) Notice: Subject to any disclaimer, the term of this patent is extended or adjusted under 35 U.S.C. 154(b) by 263 days.

(21) Appl. No.: 15/484,223

(22) Filed: Apr. 11, 2017

(65) Prior Publication Data
US 2017/0306968 A1   Oct. 26, 2017

(30) Foreign Application Priority Data

Apr. 20, 2016   (DE) .................. 10 2016 107 341

(51) Int. Cl.
*F04D 25/16*   (2006.01)
*F04D 29/42*   (2006.01)
(Continued)

(52) U.S. Cl.
CPC ............ *F04D 25/04* (2013.01); *F01D 15/005* (2013.01); *F02C 6/02* (2013.01); *F02C 6/12* (2013.01); *F02C 7/36* (2013.01); *F04D 17/10* (2013.01); *F04D 25/16* (2013.01); *F04D 25/163* (2013.01); *F04D 29/053* (2013.01); *F04D 29/056* (2013.01); *F04D 29/063* (2013.01);
(Continued)

(58) Field of Classification Search
CPC ........ F04D 25/04; F04D 25/005; F04D 25/16; F04D 25/163; F04D 29/054; F04D 29/056; F04D 29/063; F04D 29/053; F04D 29/4206; F04D 29/462; F04D 29/444; F04D 17/10; F04D 17/00; F04D 17/12; F04D 17/125; F04D 17/127; F04D 17/14; F04D 17/16; F25B 11/04; F25J 1/0012; F25J 1/0015; F25J 1/0017; F25J 1/002; F25J 1/0022; F25J 1/0037; F25J 1/004; F25J 1/0202; F25J 1/0288; F02C 6/12; F02C 6/02; F02C 7/36
See application file for complete search history.

(56) References Cited

U.S. PATENT DOCUMENTS 6,484,533 B1 * 11/2002 Allam .................... F25J 1/0012
                                                                62/643
2013/0315707 A1 * 11/2013 Spanel .................... F04D 17/12
                                                                415/67

(Continued)

*Primary Examiner* — Lindsay M Low
*Assistant Examiner* — George C Jin
(74) *Attorney, Agent, or Firm* — Collard & Roe, P.C.

(57) ABSTRACT

A turbomachine arrangement includes a housing, a turbo-expander formed with an expander rotor, a turbo-compressor formed with a first compressor rotor, and a shaft that is rotatably mounted on the housing. The shaft connects the expander rotor to the compressor rotor. The first turbo-compressor can be driven exclusively by the turbo-expander. A second turbo-compressor having a second compressor rotor is disposed on the housing such that the second compressor rotor is connected to the first turbo-compressor in parallel or in series. The second compressor rotor is driven via a transmission accommodated in the housing and via a drive shaft connecting the transmission to the second compressor rotor.

9 Claims, 1 Drawing Sheet

(51) Int. Cl.
  *F04D 25/04*  (2006.01)
  *F04D 17/10*  (2006.01)
  *F04D 29/053*  (2006.01)
  *F04D 29/056*  (2006.01)
  *F04D 29/063*  (2006.01)
  *F01D 15/00*  (2006.01)
  *F02C 6/02*  (2006.01)
  *F02C 6/12*  (2006.01)
  *F02C 7/36*  (2006.01)
  *F25B 11/04*  (2006.01)

(52) U.S. Cl.
  CPC ...... *F04D 29/4206* (2013.01); *F05D 2220/40* (2013.01); *F05D 2240/40* (2013.01); *F05D 2260/40* (2013.01); *F25B 11/04* (2013.01)

(56) References Cited

U.S. PATENT DOCUMENTS

| | | | | |
|---|---|---|---|---|
| 2014/0331639 | A1* | 11/2014 | Raimarckers | F01C 21/045 60/39.08 |
| 2017/0023011 | A1* | 1/2017 | Berti | F01D 25/16 |
| 2018/0163733 | A1* | 6/2018 | Duffney | F04D 25/024 |

* cited by examiner

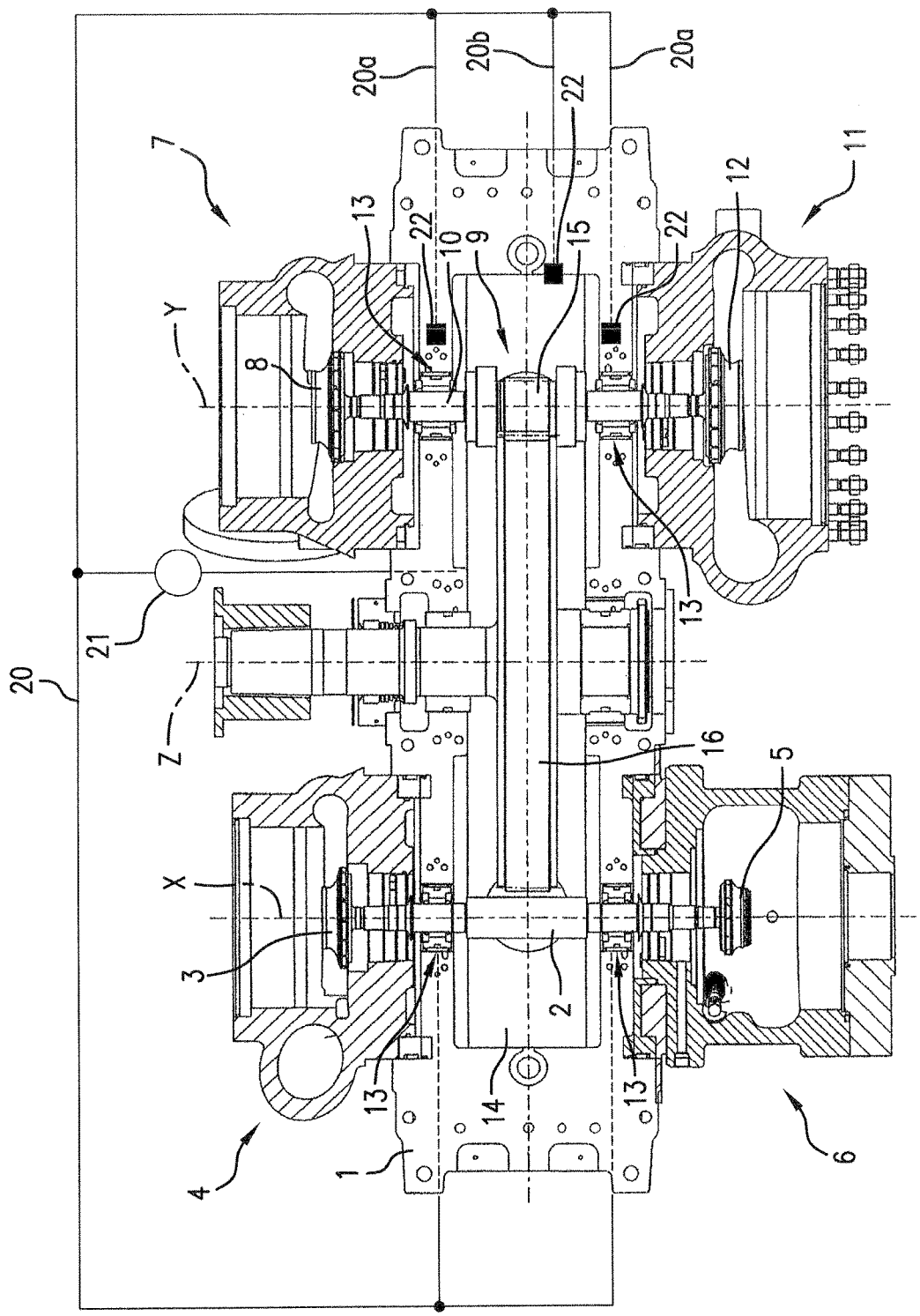

TURBOMACHINE ARRANGEMENT

CROSS-REFERENCE TO A RELATED APPLICATION

The invention described and claimed hereinbelow also is described in German Patent Application 10 2016 107 341.5, filed on Apr. 20, 2016. The subject matter of the German Patent Application is incorporated herein by reference and, provides the basis for a claim of priority of invention under 35 U.S.C. 119(a)-(d).

BACKGROUND OF THE INVENTION

The present invention relates to a turbomachine arrangement, including a housing, a turbo-expander comprising an expander rotor, a turbo-compressor comprising a first compressor rotor, and a shaft, which is rotatably mounted on the housing. The shaft connects the expander rotor to the first compressor rotor.

Known turbomachine arrangements, sometimes referred to as "companders" (compressor-expanders), are used during the expansion of a fluid (in cooling circuits, for example) for recovering pressure energy in the expander and making this usable for the compressor which is coupled to the expander. Since the quantity of energy recovered from the expander is usually not sufficient for operating the compressor, it is necessary to apply additional energy. For this purpose, the shaft that couples the expander to the compressor can be additionally driven. This has the disadvantage, however, that neither the compressor nor the expander can always be operated in the optimal speed range.

Alternatively, the compressor and the expander also can be operated separately from one another and can be coupled to each other only indirectly. Thus, the energy recovery potential is reduced due to additional conversion losses. In addition, the fact that there are two separate systems results in a need for a greater amount of maintenance and space.

SUMMARY OF THE INVENTION

The present invention overcomes shortcomings of known arts, such as those mentioned above.

The present invention provides a compander arrangement that requires little space and has high efficiency.

According to the inventive turbomachine arrangement, a turbo-expander includes a first compressor rotor that is driven exclusively by an expander rotor via the shaft, which connects the expander and compressor rotors. An additional drive is not required, and therefore the expander rotor can operate in its optimal speed range. In addition, a second turbo-compressor having a second compressor rotor is provided on the housing. The second compressor is connected to the first compressor in parallel or in series. The second compressor rotor is driven via a transmission, which is accommodated in the housing, and via a drive shaft.

The turbomachine arrangement operates in a particularly energy-efficient manner, since the expander rotor is operated in its optimal speed range. Thus, the medium to be compressed is pre-compressed in the first turbo-compressor by utilizing the recovered energy. The second turbo-compressor, which is mechanically decoupled from the first turbo-compressor, provides the remaining pressure difference or volumetric flow, as needed. Given that the turbomachines and the transmission driving the second turbo-compressor are mounted on a shared housing, a particularly compact design is achieved.

In an embodiment, disposed on the drive shaft is a third turbo-compressor, which has a third compressor rotor and is connected to the first turbo-compressor and/or the second turbo-compressor in parallel or in series. Thus, a particularly compact, multiple-stage post-compression or parallel compression is provided.

In an embodiment, the shaft and the drive shaft are mounted in the housing in fluid-lubricated bearings which are connected to one shared lubricant distribution system for providing a lubricant. The combination of a compander and a geared compressor in one housing results in potential savings, since the lubricant supply only needs to be provided once. Overall, this allows for a more compact design of the entire system. In addition, in the case, for example, of a compander having a freely rotating shaft, a sufficient lubricant flow also can be provided at rest if the lubricant distribution system is directly coupled to the transmission of the geared compressor or its ancillary units. Conversely, it is likewise conceivable to utilize the energy recovered in the expansion turbine as auxiliary energy for maintaining the lubricant circulation when the fluid flow to be expanded is continuously generated, which is the case in cooling applications. For this purpose, a lubricant pump of the lubricant distribution system is directly or indirectly coupled to the shaft.

Preferably, devices for applying the lubricant to the transmission also are provided on the lubricant distribution system. In this case, the interior chamber of the housing is preferably utilized as a collecting chamber for excess lubricant which emerges from the bearings or drops off the transmission. The lubricant preferably is conveyed in the circuit, wherein the lubricant advantageously also may perform a temperature-control function (in particular for cooling).

The transmission advantageously comprises a gear which meshes with a pinion disposed on the drive shaft. The gear advantageously has a larger diameter than the pinion and thereby establishes a speed change of its drive to the speed of the drive shaft. The gear is preferably solid and can therefore also function as a flywheel for stabilizing the speed of the compressor driven by the transmission.

In an embodiment, the rotational axis of the shaft, the rotational axis of the drive shaft and the rotational axis of the gear lie in one plane. This simplifies the structural layout and the set-up and maintenance of the turbomachine arrangement.

In an embodiment, the plane in which the rotational axes lie also forms a parting plane of the housing. In this case, the housing is designed to have at least two parts, wherein at least one housing part can be removed from at least one other housing part in such a way that the shaft, the drive shaft, and the gear can be removed separately or jointly. This simplifies the initial assembly of the turbomachine arrangement and subsequent maintenance and upkeep work, in which the rotating parts must be inspected and/or replaced.

In an embodiment, the rotational axis of the gear is situated in the middle between the rotational axis of the shaft and the rotational axis of the drive axis (perpendicular to a plane extending through the parallel rotational axes, as viewed from above). Preferably, the distance between the rotational axis of the gear and the rotational axis of the shaft and the distance between the rotational axis of the gear and the rotational axis of the drive axis are the same. This embodiment is distinguished by a particularly compact design. In this case, the gear also extends particularly close to the shaft, and therefore the gear also can transport lubricant to the shaft, for lubrication and cooling purposes, by a rotational movement. It also is possible to couple the driven shaft to the gear, as necessary, by inserting a pinion.

It is understood that the features mentioned above and which are described in the following may be used not only in the combination described, but also in other combinations or alone, without departing from the scope of the present disclosure.

BRIEF DESCRIPTION OF THE DRAWINGS

FIG. 1 is a schematic representation of a horizontal section depicted through a turbomachine arrangement, according to the invention.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The FIG. 1 turbomachine arrangement comprises a housing 1 and a shaft 2, which is rotatably mounted on the housing 1. The shaft 2 connects an expander rotor 3 of a turbo-expander 4 to a first compressor rotor 5 of a first turbo-compressor 6. An additional drive is not disposed on the shaft 2, and therefore the first compressor rotor 5 can be driven exclusively by the expander rotor 3. A second turbo-compressor 7, having a second compressor rotor 8, is disposed on the housing 1, which second compressor rotor 8 is connected to the first turbo-compressor 6 in parallel or in series. In this case, a parallel connection means that the intake regions and the outlet regions of the two turbo-compressors are in direct fluid communication in each case, without any intermediate fluid energy machines. A series connection is considered to mean that the outlet region of one of the two turbo-compressors is fluidically connected to the intake region of the other turbo-compressor. The second compressor rotor 8 can be driven via a transmission 9 accommodated in the housing 1 and via a drive shaft 10 connecting the transmission 9 to the second compressor rotor 8.

A third turbo-compressor 11, having a third compressor rotor 12, is furthermore disposed on the housing 1. The third compressor rotor 12 is connected to the first turbo-compressor 6 and/or the second turbo-compressor 7 in parallel or in series. The third compressor rotor 12 is connected to the drive shaft 10.

The shaft 2 and the drive shaft 10 are rotatably mounted on the housing 1 at fluid-lubricated bearings 13. The bearings 13 are connected to a shared, lubricant distribution system, which comprises distribution lines or conduits 20, for providing or distributing a lubricant, such as gear oil, to the working parts of the turbomachine arrangement. At least one hydraulic pump 21 pumps the lubricant through the distribution system lines or conduits 20 to one or more nozzles 22. The nozzles 22 apply the lubricant to the working parts of the turbomachine arrangement. For example, a connection line 20a connects conduit 20 to a nozzle 22 to lubricate a bearing 13. The bearings 13 are designed in such a way that excess lubricant emerges into an interior chamber 14 of the housing, where the lubricant can be or is fed back to the lubricant distribution system. A filter, not shown, may be included for filtering the lubricant collected at the interior chamber 14, for redistribution through the distribution system lines of conduits 20 and connection lines 20a and 20b.

The transmission 9 comprises a pinion 15 disposed on the drive shaft 10 and a gear 16 meshing with the pinion. A connection line 20b connected the conduit 20 to a nozzle 22 for lubricating the pinion(s) and gear(s) 16. In this case, the rotational axis x of the shaft 2, the rotational axis y of the drive shaft 10, and the rotational axis z of the gear 16 lie in a plane which forms the cutting plane of the FIGURE. This plane is also a parting plane of the housing 1, of which only a lower portion is visible in the view. The rotational axis z of the gear lies in the middle between the rotational axes x and y of the shaft 2 and the drive shaft. The expander rotor 3 and the compressor rotors 5, 8, 12 are each floatingly disposed at the ends of the shaft 2 and the drive shaft 10.

The housings of the expander 4 and the compressors 6, 7, 11 are formed as separate parts, although said housings can also be integrally formed on the housing 1 in alternative embodiments. Sealing devices for preventing a passage of lubricant out of the housing 1, or a penetration by working medium into the housing 1, are disposed between the bearings 13 and the rotors 3, 5, 8, 12, such as, for example, gas seals including without limitation as dry face seal. Alternatively, other seal types, such as labyrinth seals or floating ring seals, may be used.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A turbomachine arrangement, comprising:
a housing,
a turbo-expander comprising an expander rotor, a first turbo-compressor with a first compressor rotor, and a shaft that is rotatably mounted on the housing and that connects the expander rotor to the compressor rotor, wherein the first turbo-compressor is driven exclusively by the turbo-expander; and
a second turbo-compressor disposed on the housing and including a second compressor rotor, wherein the second compressor rotor is connected to the first turbo-compressor in parallel or in series, is driven via a transmission accommodated in the housing and is connected to the transmission via a drive shaft connecting the transmission to the second compressor rotor.

2. The turbomachine arrangement according to claim 1, further comprising a third turbo-compressor disposed on the housing, connected to the drive shaft and including a third compressor rotor, and wherein the third turbo-compressor is disposed in parallel or in series with respect to the first turbo-compressor, the second turbo-compressor or both and wherein.

3. The turbomachine arrangement according to claim 1, wherein the shaft and the drive shaft are rotatably mounted on the housing at fluid-lubricated bearings and wherein the fluid-lubricated bearings are connected to a shared lubricant distribution system that provides a lubricant.

4. The turbomachine arrangement according to claim 3, wherein means for applying the lubricant to the transmission are connected to the lubricant distribution system.

5. The turbomachine arrangement according to claim 1, wherein the transmission comprises a pinion disposed on the drive shaft, and a gear meshing with the pinion.

6. A turbomachine arrangement, comprising:
a housing,
a turbo-expander comprising an expander rotor, a first turbo-compressor with a first compressor rotor, and a shaft that is rotatably mounted on the housing and that connects the expander rotor to the compressor rotor, wherein the first turbo-compressor is driven exclusively by the turbo-expander; and
a second turbo-compressor disposed on the housing and including a second compressor rotor, wherein the second compressor rotor is connected to the first turbo-compressor in parallel or in series, is driven via a transmission accommodated in the housing and is connected to the transmission via a drive shaft connecting the transmission to the second compressor rotor,
wherein the transmission comprises a pinion disposed on the drive shaft, and a gear meshing with the pinion, and
wherein a rotational axis (x) of the shaft, a rotational axis (y) of the drive shaft and the rotational axis (z) of the gear lie in a plane.

7. The turbomachine arrangement according to claim 6, wherein the rotational axis (x) of the shaft, the rotational axis (y) of the drive shaft and the rotational axis (z) of the gear, lie in a parting plane of the housing.

8. The turbomachine arrangement according to claim 5, wherein the rotational axis (z) of the gear is disposed midway between the shaft and the drive shaft.

9. The turbomachine arrangement according to claim 1, wherein the turbo-expander or at least one of the first, second and third turbo-compressors, or both the turbo-expander and at least one of the first, the second and the third turbo-compressors is or are designed as a radial turbomachine having an expander rotor and respective first, second and third compressor rotors, disposed at one shaft end of the shaft or one end of the drive shaft, respectively.

* * * * *